(12) United States Patent
Sawyer et al.

(10) Patent No.: US 8,668,831 B2
(45) Date of Patent: Mar. 11, 2014

(54) METHOD FOR CONTAMINANT REMOVAL FROM AQUEOUS SOLUTION

(75) Inventors: John Sawyer, Charleston, WV (US);
Geoffrey Papelier, Dunbar, WV (US);
Marty L. Weirick, South Charleston, WV (US)

(73) Assignee: Liberty Hydro, Inc., South Charleston, WV (US)

( * ) Notice: Subject to any disclaimer, the term of this patent is extended or adjusted under 35 U.S.C. 154(b) by 670 days.

(21) Appl. No.: 12/762,501

(22) Filed: Apr. 19, 2010

(65) Prior Publication Data

US 2010/0307978 A1 Dec. 9, 2010

Related U.S. Application Data

(60) Provisional application No. 61/214,566, filed on Apr. 25, 2009, provisional application No. 61/236,424, filed on Aug. 24, 2009.

(51) Int. Cl.
*B01D 15/00* (2006.01)

(52) U.S. Cl.
USPC ...... 210/679; 210/694; 210/747.1; 210/502.1

(58) Field of Classification Search
USPC ............................ 210/679, 694, 747.1, 502.1
See application file for complete search history.

(56) References Cited

U.S. PATENT DOCUMENTS

| | | | | |
|---|---|---|---|---|
| 4,800,190 A | * | 1/1989 | Smolik | 502/416 |
| 5,869,321 A | * | 2/1999 | Franklin | 435/253.6 |
| 5,871,569 A | * | 2/1999 | Oehler et al. | 96/153 |

* cited by examiner

*Primary Examiner* — Chester Barry
(74) *Attorney, Agent, or Firm* — Mendelsohn, Ducker & Dunleavy, P.C.

(57) ABSTRACT

The present invention provides for a permeable reactive barrier and an effective method of removing contaminants from water using adsorbent powders, such as zero valent iron particles, adhered throughout a reticulated foam structure. This structure provides improved mass transfer, higher reaction rates and reduced residence times. The barrier includes a reticulated foam substrate with high permeability, an adherent coating and a reactive adsorbent arranged in a reticulated foam structure. The substrate can be selected from various materials including polyurethane and polyester. The adherent may be selected from a wide range of materials including polyurethanes, acrylics, silicones, siliconized acrylics, latex emulsions, and other inherently tacky materials that cure to a water resistant coating. The reactive adsorbent can be selected from various adsorbents including a powdered zero-valent iron (ZVI).

8 Claims, 1 Drawing Sheet

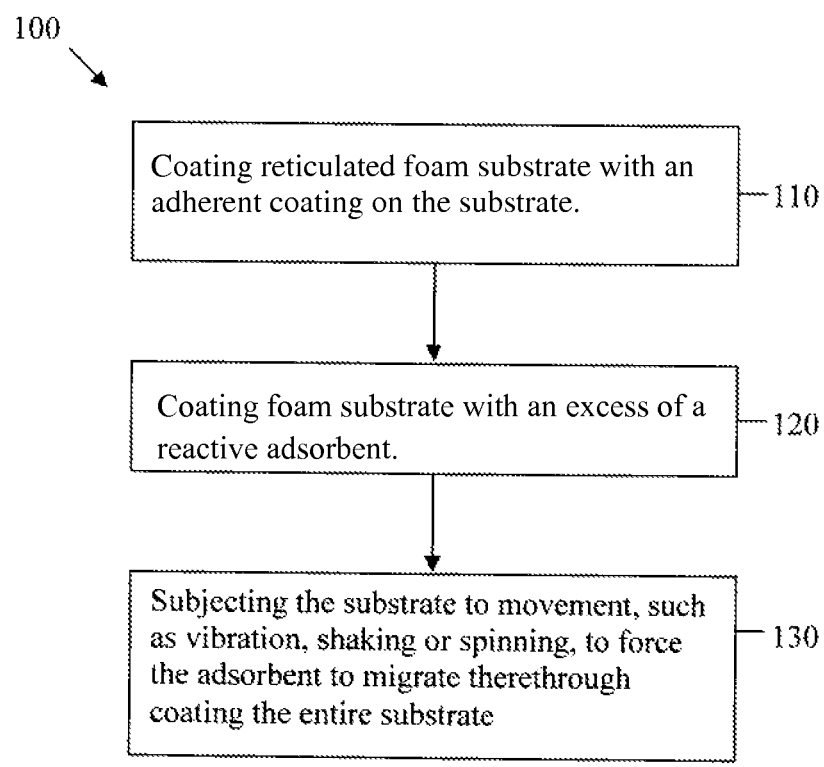

METHOD FOR CONTAMINANT REMOVAL FROM AQUEOUS SOLUTION

REFERENCE TO PENDING APPLICATIONS

This application claims the benefit of U.S. Provisional Patent Application Ser. No. 61/214,566 filed on Apr. 25, 2009 and entitled Contaminant Removal form Aqueous Solutions and of U.S. Provisional Patent Application Ser. No. 61/236,424 filed on Aug. 24, 2009 entitled Permeable Reactive Barrier.

REFERENCE TO MICROFICHE APPENDIX

This application is not referenced in any microfiche appendix.

BACKGROUND OF THE INVENTION

1. Field of the Invention

The present invention is generally directed toward a foam and method to remove contaminants from aqueous solutions, more specifically toward a method utilizing reticulated foam used in fluid treatment and the method to make same.

2. Background

There are several contaminants in surface waters that are of considerable concern due to their effects on wildlife as well as humans. These contaminants can include, but are not limited to: selenium, perchlorate, chromates, halogenated organic compounds, aluminum, lead, copper, technetium and arsenic. The prior art discloses that these contaminants can be removed or neutralized by reaction with certain adsorbents such as; but not limited to, activated carbon, diatomaceous earth, alumina, or zero valent iron ($Fe^{\circ}$, or ZVI).

However, the prior art use of these adsorbents have been shown to have economic and physical constraints with their use. For instance, while ZVI is well known as an adsorbent, drawbacks in actual application have been identified. To maximize surface area, ZVI has been used as a powder. Unfortunately, the powder quickly agglomerates, reducing both the available surface area and the ability of water to flow through the ZVI particles. Ribbons of ZVI have been used, such as iron wool, but the surface area is not maximized, and the flow path is quickly diminished. Thus, there is a need for an improvement to the removal or neutralization of contaminants in surface water.

BRIEF SUMMARY OF THE INVENTION

The present invention satisfies the needs discussed above. The present invention is generally directed toward a foam and a method to remove contaminants from aqueous solutions, more specifically toward a method utilizing reticulated foam used in fluid treatment and the method to make same.

It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

One aspect of the present invention provides for a permeable reactive barrier which is easily manufactured and its size easily controlled to remove contaminants in ground water. The barrier includes a reticulated foam substrate having a high permeability, an adherent coating and a reactive adsorbent arranged in a reticulated foam structure.

Various aspects of the substrate include any known or foreseeably known substrate material such as polyurethane and polyester. The adherent may be selected from a wide range of materials including polyurethanes, acrylics, silicones, siliconized acrylics, latex emulsions, and other inherently tacky materials that cure to a water resistant coating. The reactive adsorbent can be selected from various adsorbents including, but not limited to, powdered zero-valent iron (ZVI), activated carbon, carbon, copper, zinc, or zeolites, or any combinations thereof.

Upon reading the above description, various alternative embodiments will become obvious to those skilled in the art. These embodiments are to be considered within the scope and spirit of the subject invention, which is only to be limited by the claims which follow and their equivalents.

BRIEF DESCRIPTION OF THE DRAWINGS

FIG. 1 is a flow chart showing an embodiment 100 of the method of the present invention.

DESCRIPTION OF THE INVENTION

The present invention is generally directed toward a foam and method to remove contaminants from aqueous solutions, more specifically toward a reticulated foam used in fluid treatment and the method to make same.

It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

The present invention provides the effective removal of contaminants in ground water. By using a reticulated foam structure with the active species on the surface of the foam, many of the shortcomings of prior art permeable reactive barriers can be overcome. Examples of applications include removal of chlorinated organic compounds from groundwater or reducing hexavalent chromium species to the less toxic trivalent chromium species using zero valent iron (ZVI) particles. By incorporating the zero valent iron particles into a reticulated foam structure, the high permeability can be maintained over the course of the lifetime of the ZVI as it reacts with impurities and decontaminates the water. This structure provides improved mass transfer, higher reaction rates, and reduced reactive adsorbent volume.

One embodiment of the reticulated foam substrate of the present invention is constructed from preferably polyurethane or polyether and having an appropriate size with approximately 4 to 60 pores per inch. This substrate is coated and moistened with an adherent to give a uniform light coating over all of the surfaces of the foam. The moist coated substrate is then covered with powdered zero-valent iron (ZVI), which becomes stuck in the adherent on the surface of the substrate. An excess of the powder is applied to one or more surfaces of the substrate. Movement of the substrate, such as vibration, shaking or spinning, allows or forces the powder to migrate therethrough. As the iron powder strikes a wet surface, it adheres until the entire substrate is coated with iron particles. The amount of iron adhered to the substrate is dependent on the particle size of the iron powder and the available surface area of the substrate.

ZVI particle sizes from 1 to 350 microns are acceptable sizes, with the smaller particle sizes resulting in a lower total amount of ZVI in the resulting substrate. The larger pore sizes of the substrate result in reduced surface area, and a lower amount of ZVI. The pore size and ZVI particle size are chosen depending on the requirements of a particular application, but smaller pore sizes generally require smaller particle sizes. Further, when the substrate is placed in-ground, the pore size is chosen such that the reticulated foam substrate acts as a protective barrier to prevent migration of the surrounding soil into the reticulated structure, and the resulting blockage and flow restriction.

It is not necessary that the adherent be able to withstand permanent water contact, as the ZVI powder will form a three dimensional interlinked structure in a short time, giving some structural integrity to the coating independent of the adherent. The purpose of the adherent is to hold the ZVI in place until this bonding of the ZVI particles occurs. The net result of the ZVI particle bonding is a microporous reticulated ZVI foam.

The state of the surface of the ZVI is critical to the successful reaction with the oxidized selenium, or other contaminants, in the water. As such, the surface oxides must be removed from the iron surface by dissolution. Said dissolution may be accomplished with an acid species where the anion is soluble as an iron salt or, in cases where the water has the proper chemistry, simply by contact with flowing water. Once a surface of truly zero valent iron is established, the normal chemical reactions proceed.

The reactive adsorbent may include more than just ZVI. For instance, an activated carbon may be included to assist in the removal of certain contaminants, either before or after reduction by ZVI. In some cases the activated carbon alone may be sufficient to completely remove the contaminants.

One embodiment of the use of a permeable reactive barrier to act as a filter for ground water having contaminants therein is disclosed. This permeable reactive barrier is easily manufactured and its size easily controlled to remove contaminants in ground water. The barrier includes a reticulated foam substrate having a high permeability, an adherent coating and a reactive adsorbent arranged in a reticulated foam structure.

Various aspects of the substrate include any known or foreseeably known substrate material such as polyurethane and polyester. The adherent may be selected from a wide range of materials including polyurethanes, acrylics, silicones, siliconized acrylics, latex emulsions, and other inherently tacky materials that cure to a water resistant coating. The reactive adsorbent can be selected from various adsorbents including, but not limited to, powdered zero-valent iron (ZVI), activated carbon, carbon, copper, zinc, or zeolites, or any combinations thereof.

The present invention provides the effective removal of contaminants in ground water. By using a reticulated foam structure with the active species on the surface of the foam, many of the shortcomings of prior art permeable reactive barriers can be overcome. Examples of applications include removal of chlorinated organic compounds from groundwater or reducing hexavalent chromium species to the less toxic trivalent chromium species using zero valent iron (ZVI) particles. By incorporating the zero valent iron particles into a reticulated foam structure, the high permeability can be maintained over the course of the lifetime of the ZVI as it reacts with impurities and decontaminates the water. This structure provides improved mass transfer, higher reaction rates, and reduced reactive adsorbent volume.

In one use, the reactive reticulated foam is placed in the ground so as to intercept the groundwater containing contaminants. As the water flows through the reactive foam, the contaminants are reduced, destroying them, or rendering them non-toxic. The amount of foam required depends on the residence time required to completely react the contaminants, the flow rate of the ground water, and the specific site conditions.

There are several benefits from the present invention. One of the major benefits is the foam substrate has a greatly increased pore area, allowing for a longer life of the media. Iron undergoes an expansion as the oxidation process proceeds, opening up new surface area to the liquid and providing continued area for reactions to occur. As the natural expansion of the iron closes off the flow path of the fluid, it prevents further flow through the remediation unit. The present invention provides a larger volume to absorb this expansion, and thus a longer useful life, with a greater proportion of the iron being used to remove contaminants, maintaining a low fluid flow pressure drop throughout the life of the media.

Another benefit of the present invention is the surface area of the iron is greatly increased from other designs, resulting in a larger surface of solid contacting the liquid, leading to a higher reaction rate with the contaminants per unit volume. This higher reaction rate means a much smaller unit can be used, saving space and cost.

The amount of iron used in reducing contaminants is increased, resulting in a decreased volume of iron left at the end for disposal/recycle, resulting in a further reduction in costs.

A further benefit of the present invention is that low resistance to flow leads to a lowered pressure drop, and decreased bypass around the reactive foam. In most cases the flow rate through the reactive foam will be greater than through the surrounding soil, decreasing the amount of bypass over other designs.

As illustrated in FIG. 1, an embodiment 100 of the method to create the reticulated foam used in the present invention is disclosed. A reticulated foam substrate is coated with an adherent coating the adherent, as shown in step 110, and then with an excess of a reactive adsorbent, as shown in step 120. These adsorbents can be selected from various adsorbents including, but not limited to, powdered zero-valent iron (ZVI), activated carbon, carbon, copper, zinc, or zeolites, or any combinations thereof. The substrate is then subjected to movement, such as vibration, shaking or spinning, forces the adsorbent to migrate therethrough, coating the entire substrate, as shown in step 130.

Examples of use include:

Example 1

Ten disks of three inch diameter by one inch thick reticulated polyurethane foam with nominal 10 pores per inch were coated with a urethane paint to give approximately 1.1 g/cubic inch of urethane coating. The disks were then placed one at a time in a plastic container and 60 g of Mallincrockt Baker zero valent iron powder was added. The container was sealed and tumbled to give a uniform coating of the ZVI over the entire volume of the foam disk. The disks were removed from the container and allowed to dry in air. After drying the disks contained 45-50 g of ZVI, or 6 g/cubic inch.

Example 2

A six inch diameter by one inch thick disks of reticulated polyurethane foam with nominal 10 pores per inch was coated with an aqueous siliconized acrylic slurry to give a coating of approximately 1.1 g/cubic inch of adherent. The disks were then placed one at a time in a plastic container and 60 g of Mallincrockt Baker zero valent iron powder was added. The container was sealed and tumbled to give a uniform coating of the ZVI over the entire volume of the foam disk. The disks were removed from the container and allowed to dry in air.

Example 3

The disks from example 2 were tested by passing a stream of selenium laden water through them with a variable residence time. The results are given in table 1 below. These results show the ZVI foam disks remove selenium according to first order kinetics in the selenium concentration, with a half life of about 12 minutes. Thus, the flow rate is adjusted to give the desired residence time in the ZVI foam bed to give the desired reduction of the inlet concentration of selenium in the outlet.

TABLE 1 selenium reduction by contact with the ZVI foam

| Residence Time in minutes | Total Selenium, ppb |
|---|---|
| Inlet (0.0) | 24.6 |
| 2.7 | 21.7 |
| 14.2 | 10.8 |
| 21.5 | 7.36 |

Example 4

Ten disks of 67 millimeter diameter by one inch thick reticulated polyurethane foam with nominal 10 pores per inch were coated with a silicone adhesive to give approximately 1 g/cubic inch of silicone coating. The disks were then placed one at a time in a plastic container and 100 g of HCA-150 zero valent iron powder was added. The container was sealed and tumbled to give a uniform coating of the ZVI over the entire volume of the foam disk. The disks were removed from the container and allowed to dry in air. After drying the disks contained an average of 7.3 g of ZVI, or 1.3 g/cubic inch.

Example 5

Ten disks of 67 millimeter diameter by one inch thick reticulated polyurethane foam with nominal 10 pores per inch were coated with a polyurethane adhesive to give approximately 1 g/cubic inch of polyurethane coating. The disks were then placed one at a time in a plastic container and 100 g of HCA-150 zero valent iron powder was added. The container was sealed and tumbled to give a uniform coating of the ZVI over the entire volume of the foam disk. The disks were removed from the container and allowed to dry in air. After drying the disks contained an average of 22 g of ZVI, or 4 g/cubic inch.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

The invention claimed is:

1. A method to remove contaminants from an aqueous solution comprising the steps of:
   (a) placing a permeable reactive barrier in an aqueous stream containing contaminants, said permeable barrier comprising:
      a reticulated foam substrate;
      an adherent coating said reticulated foam substrate; and
      reactive adsorbent coating said adherent; and
   (b) running said aqueous stream through said permeable reactive barrier.

2. The method of claim 1, wherein said reticulated foam substrate is constructed from a material selected from ceramics, metals, polyethers, polyurethane and polyester.

3. The method of claim 1, wherein said adherent is selected from the group consisting of polyurethanes, acrylics, silicones, siliconized acrylics, latex emulsions, and other inherently tacky materials that cure to a water-resistant coating.

4. The method of claim 1, wherein said reactive adsorbent is selected from the group consisting of powdered zerovalent iron, activated carbon, carbon, copper, zinc, zeolites, and any combinations thereof.

5. The method of claim 1, wherein said reticulated foam substrate has 4 to 60 pores per inch.

6. The method of claim 1, wherein said permeable reactive barrier is made by a method comprising the steps of:
   (a) coating a reticulated foam substrate with an adherent (110);
   (b) coating said adherent of step (a) with a reactive adsorbent (120); and
   (c) moving said reticulated foam substrate to force said reactive adsorbent to migrate through said reticulated foam substrate effectively coating substantially all of said reticulated foam substrate (130).

7. The method of claim 6, wherein the reticulated foam substrate is reticulated polyethylene foam.

8. The method of claim 6, wherein said reticulated foam substrate is reticulated polyether foam.

* * * * *